United States Patent Office 3,529,053
Patented Sept. 15, 1970

3,529,053
METHOD OF FORMING DENSE SMOOTH SURFACED FURFURYL ALCOHOL RESIN COMPOSITIONS
Joe B. Smith, San Rafael, and Robert Merrill Farrand, Pacifica, Calif., assignors, by mesne assignments, to American Hospital Supply Corporation, Evanston, Ill., a corporation of Illinois
No Drawing. Filed Aug. 11, 1966, Ser. No. 571,709
Int. Cl. B29c 25/00, 1/04
U.S. Cl. 264—236                                6 Claims The present invention relates to improvements in furfuryl alcohol resins and more particularly to an improved method for forming dense smooth surfaced furfuryl alcohol resin compositions suitable for use in the laboratory as counter tops, bench tops, sinks, drainboards, and the like.

Counters, bench tops, and like laboratory surfaces must meet relatively strict requirements. They must be strong and durable, heat resistant, and relatively inert to a wide variety of chemicals including acids, alkalis, salts, and organic solvents. Previous materials used for such purpose such as soapstone, resin impregnated sandstone, cement or resin-asbestos boards and the like, have not always proved satisfactory. Not only are such materials frequently quite expensive (e.g., soapstone and asbestos mixtures) but in many cases such materials are not sufficiently resistant to chemicals or thermal shock (e.g., sandstone). The provision of a low cost, dense, chemically and thermally resistant composition for use in the laboratory is therefore highly desired.

As a group, the furfuryl alcohol resins possess chemical properties and characteristics that are incomparable with other groups of resins. The resin raw material is capable of reacting with itself in the presence of acid catalysts to form a dense cross-linked resin of unique properties. The resulting polymers are notable for their excellent resistance to alkalis, combined with equivalent acid resistance, with the result that the furfuryl alcohol resin polymers have been widely used in the manufacture of binding resins for foundry core sands and for making chemically resistant mortars. The core binders are normally cured at relatively high temperatures (425° F. and higher) to produce dense, completely cured polymers whereas the mortar cements (used, for example, between tile and brick in the construction of digestor linings, pickling tanks, fume stacks, etc.) are normally designed to harden in a few hours at installation temperature with curing to maximum chemical resistance occurring within a few days. Furfuryl alcohol resins have also been adapted by special processing to the manufacture of relatively small molded or cast parts such as pipe, valve bodies and like structures. See, for example, U.S. Pat. No. 2,768,408.

Despite the desired chemical properties of the furfuryl alcohol resins and the fact that such resins are generally recognized as the lowest cost corrosion resistant thermosetting resins available, the furfuryl alcohol resins have not been adaptable to large scale molding or forming applications such as the molding of laboratory work surfaces. This is because the conditions required to produce the dense, chemically resistant fully cured polymers essential to such use are more drastic than the conditions necessary to produce the partial polymers used in mortar cements and like products. As is well known, the reaction between the resin and catalyst to effect full polymerization of the resin generates heat and water under extremely exothermic conditions. Such reaction can be very violent, and in some cases almost explosive. As a result, it is difficult to carry out the polymerization reactions within closed molds. For the same reason, attempts to form resinous bodies of any size within an open mold have not been successful because of the tendency of a resin to foam up into a useless and shapeless mass. Structures of any size or strength formed in an open mold have, therefore, required the bonding of successive layers of polymer to one another (each perhaps a ¼ inch or less in thickness), with consequent time delays for the setting of each layer. Moreover, a necessity of inserting reinforcement between and extending into the separate layers to ensure desired strength of the completed structure renders such method even less commercially feasible. The foaming tendency has also made the forming of laboratory bench tops and like objects requiring smooth unbroken surfaces a virtual impossibility, prior to the present invention. As is well known, even the smallest pin hole or like imperfection in a laboratory surface may lead to a rapid deterioration of the underlying structure, with a consequent limited usefulness of the molded material.

It is apparent that if a method could be devised by which furfuryl alcohol resins could be molded and cured in a single operation in an open mold to provide structures having relatively smooth unbroken exterior surfaces, the hazards and disadvantages of previous processing techniques involving these resins could be largely overcome. It is accordingly a general object of the present invention to provide an improved method, making use of an open mold, by which relatively large, dense, chemically and thermally resistant furfuryl alcohol resin structures can be easiy formed.

It is another object of the invention to provide such a method which makes possible the molding of resin structures having relatively smooth, unbroken exterior surfaces.

A further object of the invention is to provide such a method which is economical and which makes use of readily available equipment and procedures.

A particular object of the invention is to provide an open mold method for forming smooth surfaced, relatively large laboratory structures, such as laboratory counter tops, benches, sinks, and drainboards, from furfuryl alcohol resins.

Additional objects and features of the invention will appear from the following description in which a preferred embodiment of the invention has been set forth in detail.

In accordance with the present invention, relatively large molded furfuryl alcohol resin structures are formed in an open mold process which eliminates the foaming problem and which ensures that the exposed exterior surface of the final molded product is smooth, unbroken and free of pin holes or other surface imperfections of the type likely to lead to deterioration in use. To carry out our process, we preferably initially prepare the mold by coating the mold surface with a release agent following which a polymerized material is applied to the mold surface in the form of a thin continuous film which is separated from the mold by the release agent. A furfuryl alcohol resin composition is prepared for molding by premixing a suitable acid catalyst with a finely divided acid resistant inert filler such as carbon. The catalyst containing filler can then be mixed with the resin which, in a preferred procedure, may contain an additional amount of acid resistant inert filler, for example, a mixture of finely divided carbon and silica. The reactive mixture of furfuryl alcohol resin catalyst and filler is then introduced to the mold, preferably in a gradual pouring action moving from one end of the mold to the other, with the result that the resin is separated from the mold by the thin film of polymerized material. The resin is then advanced to the set stage within the mold by gradual heating at a temperature below about 150° F., following which the solidified resin is removed from the mold and the film of polymerized material stripped from the resin to reveal the finished exterior surface of the molded part. It is a feature of the invention that the setting of the resin adjacent the thin barrier film achieves the desired smooth surfaced configuration of the molded part. The molded part is then subjected to a gradual post curing operation at temperatures below about 280° F., during which the temperature of the resin is gradually raised to a desired maximum curing temperature (about 275° F.) and gradually reduced to room temperature.

In a variation of the processing, useful with certain of the acid catalysts herein disclosed, the curing is carried out as a single operation, following which the barrier film is stripped from the final molded product. This variation is possible within the relatively low range of curing temperatures employed (e.g., about 140° to 275° F.).

The process described herein has been found particularly adapted to the successful open mold manufacture of laboratory counter tops and sinks possessing smooth, unbroken chemically and thermally resistant surfaces. The molded structures have been demonstrated to have a dense, fully cured composition which is characterized by superior hardness, toughness, and resistance to thermal shock as well as desired chemical resistance.

The term furfuryl alcohol resin as used herein refers generally to the commercially available low viscosity liquid resins. Such resins in the liquid form have a brownish black appearance, a viscosity at 25° C. of about 150 to 350 centipoises, and a specific gravity of the order of 1.20. The furfuryl alcohol resins are thermo-setting and capable of reacting with themselves in the presence of an acid catalyst to form hard, tough solids that will not melt or soften after conversion. Chemically, the initial and predominant reaction during curing of the resin is an intermolecular dehydration involving the hydroxyl group of one molecule with the active alpha hydrogen atom of another molecule. Further reaction in the same manner leads to higher molecular weight condensation products (e.g., having molecular weights ranging from about 100 to about 10,000) in which furan rings are linked together by methylene bridges in a linear chain. With the addition of the acid catalyst to the furfuryl alcohol resin polymer, a network of cross linkages forms through nuclear double bonds to complete the resinification. This type of resinification permits a polymer to be produced of good over-all chemical resistance, density and strength at relatively low temperatures. The cured resin retains the characteristic brownish black color of the liquid and, in addition to excellent chemical resistance, possesses excellent heat resistance up to about 375° F., or higher, a high degree of resistance to abrasion, and is dimensionally stable.

While it is possible to use any of the commercially available acid catalysts for furfuryl alcohol resins in carrying out the present invention, we have found that preferred results are obtained through use of specific acid catalysts having desired characteristics. Since the tendency toward a violent foaming reaction is to be avoided, the acid catalyst should be one which has a minimum tendency to produce this effect. In addition the acid catalyst should be one that is easily mixed with an inert acid resistant filler such as carbon. Preferred acid catalysts will consequently be in solid or crystalline form at room temperatures, capable of being ground or pulverized to a finely divided state for simplified intermixing with the inert filler. In general, we have found that a preferred acid catalyst for use in the present invention is aniline hydrochloride which is normally a crystalline solid (M.P. 198° C.). Satisfactory results are also obtained with crystals of p-toluene sulfonic acid (M.P., anhydrous form, 106–107 degrees C.) and sulfamic acid (M.P., 205 degrees C.). Each of these acid catalysts is normally in solid crystalline form at room temperature and can be easily ground or dispersed in the inert filler. To ensure complete resinification or curing of the furfuryl alcohol resin, the acid catalyst should be present in the amount of about 1 to 4 percent on the weight of the liquid resin.

Inert acid resistant fillers useful in carrying out the present invention include finely divided carbon and silica. Amorphous carbon is particularly adapted to mixing in the finely divided form with the acid catalysts, and preferably should have a particle size on the order of 80 to 44 microns. The silica, likewise, can be in the amorphous form, with a particle size ranging from about 80 to 350 microns. To further reduce any tendency toward foaming, the acid resistant inert filler should preferably be iron free, that is, the iron content should be less than about 0.01 percent.

In formulating the furfuryl alcohol resin compositions for molding operations in accordance with the invention, the solid acid catalyst is ground or dispersed in a substantial portion of finely divided carbon or like inert filler. In a typical operation, the acid catalyst is mixed with approximately half the ultimate carbon content, for example, in a ball mill or a portable cement mixer or like rotary mixer. The remaining inert filler, which may comprise carbon or a mixture of carbon with silica or like inert filler, may be advantageously added to the liquid furfuryl alcohol resin. Altogether, the inert filler will comprise about 70 to 80 percent by weight of the total formulation, with the liquid resin correspondingly comprising about 20 to 30 percent by weight of the formulation.

In general, assuming use of a furfuryl alcohol resin, acid catalyst and a quantity of finely divided inert fillers, as herein described, the proportions may range as follows:

| | Percent |
|---|---|
| Furfuryl alcohol resin | 20–30 |
| Acid catalyst | 0.2–1.2 |
| Inert filler: | |
|    Carbon | 20–70 |
|    Silica | 25–70 |

The foregoing general range of ingredients is specified to make clear that the invention is not limited to certain of the ingredients, or to specific proportioning of the ingredients as may be disclosed herein by way of example.

As previously indicated, the practice of the invention involves the use of an open mold suitably formed in the shape of a laboratory bench top, counter, sink, drainboard, etc. In this regard, the bottom or lower inner surface of the mold corresponds to the upper surface of the finished product. The molds may be suitably constructed of metal or other material capable of withstanding heating without substantial deformation. By way of illustration, a suitable mold for use in fabricating a laboratory counter top may be of aluminum construction with side and bottom walls averaging about ¾ to 1 inch in thickness. As a generalized procedure, a non-polymerizable release agent is first applied to the interior mold surface. Film forming polymerized material is next applied to the mold to form a barrier film separated from the mold by the release agent. For example, the polymerized material may be sprayed in liquid solution or dispersion onto a preheated mold to cause vaporization of the liquid and deposit of the polymerized material as a thin continuous film on the mold surface. Alternatively, the polymerized film forming material may be applied to the mold at room temperature, following which the mold can be heated to drive off the liquid (solvent or diluent) and thereby leave a thin continuous polymerized film over the surface of the mold. In either event, the polymerized barrier film is separated from the mold by the non-polymerized coating of release agent.

Just prior to molding, the pre-mixed acid catalyst and inert filler are mixed with the liquid furfuryl alcohol resin and the resin mixture subjected to thorough intermixing. The reactive furfuryl alcohol resin composition can now be poured into the mold in a gradual pouring process proceeding from one end of the mold to the other. Although not necessary, the mold form can be vibrated during the pouring and the resin composition rodded or otherwise agitated to ensure elimination of all entrapped air.

Following the filling of the mold with a polymerizable furfuryl alcohol, resin, the mold and resin compositions are heated at a temperature below about 150° F., for a period of time sufficient to advance the resin to the set state. In a preferred procedure, the mold and solidified resin are then allowed to cool and the solidified resin is removed from the mold along with the barrier film. It will be understood that the resin and barrier film adhere to one another, whereas the barrier film separates easily from the mold because of the presence of the release agent. The barrier film can now be stripped from the solidified resin to expose the desired surface configuration of the molded product. We have found that the described molding procedure, involving the use of premixed acid catalyst and filler and the use of a mold form coated with a smooth continuous barrier film of polymerized material, ensures the production of molded structures having relatively smooth non-porous exterior surfaces which are virtually free from pin holes or other surface imperfections. The stripped molded parts can now be post-cured at relatively low temperatures within the range from about 150 to 280° F., to complete the molding without alteration of the desired characteristics of the smooth exterior molded surface. The post-curing step is preferably performed over a prolonged period (e.g. from about 15 to 30 hours) during which the temperature is gradually raised from 150 to about 275° F., (e.g., in the two-hour stages), following which the temperature is gradually reduced to about 150° F., and the material allowed to cool.

The following examples are illustrative of the practice of the present invention. For convenience in these examples, all proportions are expressed as parts by weight.

EXAMPLE 1

A very satisfactory composition for molding a laboratory counter top has been formulated as follows:

Furfuryl alcohol resin (Reichold Chemicals, Inc. #4748) _____ 26.0
Filler:
    Carbon (Great Lakes Carbon Corp. #3009-2) _____ 30.0
    Silica (Gopher State Silica Company #1230) 44.0
Aniline hydrochloride (1.5 percent based on the resin) _____ 0.39

100.39

In formulating the above ingredients, dry crystals of aniline hydrochloride were mixed with approximately fifteen parts by weight of carbon, the remaining carbon being mixed directly with the liquid resin. The dry carbon and intermixed catalyst were slurried with the resin mixture by adding the dry ingredients to the liquid resin in a wet mixing procedure. The silica (in amorphous form) was added to the liquid resin in similar fashion. The mixture was then slurried to provide a reactive furfuryl alcohol resin composition.

An aluminum mold suitable for molding counter tops was prepared by first applying a polyvinyl alcohol release agent (Ram Chemical Company "Part-All #2") to internal surfaces of the mold. The mold was then placed in an oven and heated for about 4 to 6 minutes at about 350° F., following which the mold was removed and sprayed with a one to one emulsion of polyethylene powder in water to thereby evaporate the water and leave a thin, continuous, film of polyethylene over the internal surfaces of the mold. The mold was then returned to the oven and heated for about 20 to 25 minutes to fuse the polyethylene into a substantially impervious polymerized film. The mold was next cooled to room temperature and filled to a desired depth of one to two inches with the furfuryl alcohol resin composition. The curing cycle was initiated by placing in an oven and heating to 140° for a period of about two hours to advance the furfuryl alcohol resin to the set stage. The solidified resin was removed from the mold and the polyethylene film stripped from the mold to reveal a smooth unbroken molded surface. The molded structure was then returned to the oven and heated in successive two-hour stages at 150° F., 175° F., 200° F., 225° F., and 250° F., finally being held at 275° F. for about 12 hours. The oven temperature was then reduced in reverse two-hour stages to about 150° F., following which the molded composition was removed from the oven and allowed to cool.

As a variation on the foregoing procedure, the polyethylene powder was dissolved in a substantially equal weight proportion of solvent comprising an intermixed solution of 40 to 60 percent acetone, 60 to 40 percent methyl-ethyl ketone and 2 to 5 percent dioctyl phthalate (plasticizer). The polyethylene in solvent solution was then sprayed on a mold form pre-coated with the polyvinyl alcohol at substantially room temperature. The mold was left for a sufficient period of time to deposit a thin film of polyethylene on interior surfaces of the mold by solvent evaporation technique. The mold was then filled with furfuryl alcohol resin in the manner described in Example 1 for curing according to the procedure described.

EXAMPLE 2

A molding composition useful in fabricating laboratory sinks was formulated as follows:

Furfuryl alcohol resin _____ 30.0
Filler:
    Carbon _____ 40.0
    Silica _____ 30.0
p-Toluene sulfonic acid _____ 0.4

100.4

The above ingredients were formulated substantially as in Example 1.

Prior to molding, an aluminum sink mold was prepared substantially as in Example 1. The resin formulation was placed in the mold and advanced to the set stage by heating in an oven at 170° F., for about two hours. Thereafter, the polyethylene film was stripped from the molded part and the molded part subjected to a post-curing cycle substantially as in Example 1.

EXAMPLE 3

A counter top composition was formulated as in Example 1 except that 0.8 part by weight of sulfamic acid was added along with the aniline hydrochloride to provide a somewhat more vigorous curing cycle. The liquid resin composition was then poured into the mold and the mold subjected directly to the post-curing cycle without any intermediate step of curing to the set stage. Following the post-curing cycle, the polyethylene barrier film was stripped from the molded part to reveal a smooth surfaced, unbroken counter top.

EXAMPLE 4

Furfuryl alcohol resin compositions, formulated and cured as in each of Examples 1, 2 and 3, were prepared for testing by cutting specimen samples approximately 0.5 inch square. The cut pieces were placed in an oven and suspended on end supports, and subjected to a pressure at a point midway between the end supports equivalent to 264 pounds per square inch of cross sectional area. The test samples were then heated gradually from an initial temperature of 150° until a temperature was reached at which the strips deflected at 0.005 inch adjacent the center point, at which time the oven temperature was read. In every case the oven tempertaure was substantially in excess of 350° F.

The above tests were repeated on successive runs of counter top and sink formulations prepared in accordance with Examples 1, 2 and 3, with similar results.

EXAMPLE 5

Molded counter tops and sinks, prepared by the general procedures of Examples 1, 2 and 3 were subjected to spot tests to determine chemical resistance by applying appreciable quantities of each of the following chemicals (covered to avoid evaporation) to the smooth surface of the molded structure: hydrochloric acid (37%), sulfuric acid, acetic acid (glacial), formic acid (88–90%), hydrofluoric acid (4%), phosphoric acid (85%), ammonium hydroxide, sodium hydroxide (30%), sodium hypochlorite (5%), sodium sulfide (30%), zinc chloride (50%), calcium hypochlorite, sodium carbonate (25%), sodium chloride, methyl alcohol, ethyl alcohol, butyl alcohol, benzol, xylene, toluene, ethyl acetate, amyl acetate, acetone, chloroform, carbon tetrachloride, phenol (15%), cresol, formaldehyde, trichlorethylene, ether, monochlorobenzene, aquaregia, amyl alcohol and hydrogen peroxide (30%).

Visual observation showed no visibble effects of the exposure to any of the foregoing chemicals. The smooth surface of the sink and counter tops remained unblemished and substantially in original form.

From the above it will be apparent that our new molding procedure and method is of great value in facilitating the manufacture of a wide variety of relatively large molded structures, and particularly laboratory counter tops, sinks, drainboards and like structures which have not heretofore been capable of being molded from furfuryl alcohol resins. Moreover, our method solves a serious foaming problem prevalent in the molding of furfuryl alcohol resins which has prevented any wide spread manufacture of large smooth surfaced structures of this type.

To those skilled in the art to which this invention relates, many changes and procedures and widely differing embodiments and applications of the invention will subject without departing from the spirit and scope of the invention. For example, while use of a mold release agent prior to applying the thin substantially impervious barrier film is preferred, processing in accordance with the present invention can be satisfactorily performed using polished molds and only the polymerized barrier film. Accordingly, as these and other variations are clearly within the scope of the present invention, it should be understood that the disclosures and descriptions herein are purely illustrative and are not intended to be in any sense limiting.

We claim:

1. A process for molding furfuryl alcohol resin into a dense, chemically and thermally resistant, object comprising the steps of:
   (a) forming a molding composition by mixing 20 to 30 percent, by weight of said composition, of a furfuryl alcohol resin having a viscosity between about 150 to about 350 centipoises at 25° C. with 70 to 80 percent by weight of inert acid-resistant filler and with 0.2 to 1.2 percent by weight of an acid catalyst;
   (b) providing an open mold having a cavity with the desired configuration for said object, said cavity having a portion thereof with a thickness of at least about ½ inch;
   (c) forming a continuous film of polyethylene on the portions of said mold defining said cavity into which said composition is to be introduced;
   (d) thereafter introducing said composition into said mold cavity to fill said cavity until at least about ½ inch in thickness of said composition is deposited in said cavity;
   (e) heating said composition in said mold at a temperature below 150° F. at a rate of heating insufficient to cause internal foaming of said composition.
   (f) maintaining said composition at said temperature for a period of time sufficient to advance said composition to a solidified, set stage;
   (g) separating the solidified composition together with said film of polyethylene from the mold;
   (h) stripping said film from the molded, solidified composition;
   (i) post curing the stripped molded composition by heating said composition to between about 150° F. and about 280° F. for a period of time sufficient to complete curing without alteration of the characteristics of the exterior molded surface thereof.

2. A process as in claim 1 wherein said film of polymerized material is formed by applying said material in liquid solution or dispersion to a preheated mold, whereby the liquid is vaporized leaving said film of polymerized material on the surface of said mold.

3. A process as in claim 1 wherein said catalyst is an acid catalyst selected from the group consisting of aniline hydrochloride, p-toluene sulfonic acid, sulfamic acid, and mixtures thereof.

4. A process for molding furfuryl alcohol resin into a dense, chemically and thermally resistant, smooth surfaced object having a portion thereof with a thickness of at least about ½ inch, comprising:
   (a) forming a molding composition by mixing about 20 to about 30 percent, by weight of said composition, of a furfuryl alcohol resin having a viscosity between about 150 to about 350 centipoises at 25° C. with about 70 to about 80 percent by weight of said composition of inert acid-resistant filler and with about 0.2 to 1.2 percent by weight of said composition of an acid catalyst;
   (b) providing an open mold having a cavity with the desired configuration for said object, said cavity having a portion thereof with a thickness of at least about ½ inch;
   (c) forming a thin continuous film of polymerized material on the portions of said mold defining said cavity into which said composition is to be introduced;
   (d) thereafter introducing said composition into said mold cavity to fill said cavity until at least about ½ inch in thickness of said composition is deposited in said cavity;
   (e) heating said composition while in said mold above room temperature and below about 150° F. at a rate of heating insufficient to cause internal foaming of said composition;
   (f) maintaining the heating of said composition above room temperature and below about 150° F. for a period of time sufficient to advance said composition to a solidified, set stage;
   (g) separating the solidified composition together with said film of polymerized material from the mold;
   (h) stripping said film from the molded, solidified composition; and
   (i) post curing the stripped molded composition by heating said composition to between about 150° F. and about 280° F. for a period of time sufficient to complete curing without alteration of the characteristics of the exterior molded surface thereof.

5. The process as defined in claim 4 and the additional step comprising:
   applying a non-polymerizable release agent to the portions of said mold defining said cavity prior to forming a thin continuous film of polymerized material thereon.

6. A process as in claim 4 wherein said furfuryl alcohol resin is premixed with a finely divided acid-resistant inert filler selected from the group consisting of finely divided carbon and silica.

References Cited

UNITED STATES PATENTS

| | | | |
|---|---|---|---|
| 2,290,794 | 7/1942 | Alvardo et al. | |
| 2,860,947 | 11/1958 | Kalat | 264—338 |
| 2,768,408 | 10/1956 | Strigle et al. | |
| 2,851,330 | 9/1958 | Taylor | 117—5.3 |
| 2,994,111 | 8/1961 | Koss et al. | 117—5.1 |
| 3,068,526 | 12/1962 | Croan | 264—338 |
| 3,115,386 | 12/1963 | Zentmyer | 264—338 |
| 2,368,426 | 1/1945 | Root et al. | 260—88.5 |
| 3,057,026 | 10/1962 | Blaies et al. | 260—88.5 |

DONALD J. ARNOLD, Primary Examiner

A. H. KOECKERT, Assistant Examiner

U.S. Cl. X.R.

260—41, 88.5; 264—338